United States Patent [19]
Witt et al.

[11] 3,834,008
[45] Sept. 10, 1974

[54] METHOD OF JOINING TWO WIRE CORDS

[75] Inventors: Jerry L. Witt; Charles F. Freeman, Sr., both of Winnsboro; Joseph E. Douglas, Ridgeway, all of S.C.

[73] Assignee: Uniroyal, Inc., New York, N.Y.

[22] Filed: Jan. 29, 1973

[21] Appl. No.: 327,261

[52] U.S. Cl............ 29/447, 29/526, 24/28, 264/230, 403/273
[51] Int. Cl............................. B23p 11/02
[58] Field of Search ....... 29/447, 526; 264/230; 24/28 X, 27; 403/273

[56] References Cited
UNITED STATES PATENTS

| | | | |
|---|---|---|---|
| 825,116 | 7/1906 | Engels | 29/447 UX |
| 911,583 | 2/1909 | Focht | 24/27 UX |
| 2,739,829 | 3/1956 | Pedlow et al. | 29/447 X |
| 3,139,468 | 6/1964 | Wheat | 29/447 UX |
| 3,243,211 | 3/1966 | Wetmore | 29/447 UX |
| 3,316,343 | 4/1967 | Sherlock | 403/273 X |
| 3,355,202 | 11/1967 | Shannon | 29/447 UX |
| 3,714,316 | 1/1973 | Angeloff | 264/230 |

*Primary Examiner*—Charlie T. Moon
*Attorney, Agent, or Firm*—Charles A. Blank, Esq.

[57] ABSTRACT

The method of joining two wire cords, particularly two wire tire cords, comprises bending a first wire cord near the end thereof. The end length of the first wire cord is disposed within a heat-shrinkable tubing and a second wire cord is bent near the end thereof. The bent regions of the cords are interlocked and the tubing is disposed over the interlocked regions of the cords. Heat is then applied to the tubing to shrink the tubing tightly to join the cords.

3 Claims, 7 Drawing Figures

PATENTED SEP 10 1974 3,834,008

3,834,008

METHOD OF JOINING TWO WIRE CORDS

This invention relates to a method of joining the end lengths of two wire cords and, more particularly, two wire tire cords.

Because of the stiffness of wire tire cord, it is not practical in a weaving process to tie knots to join the ends of the cords from a spent creel to those of replacement cords for the loom. Accordingly, a method for rapidly joining the end lengths of wire cords is very advantageous in minimizing the time required for supplying replacement cords to the loom.

As used herein, the term "cord" is intended to include a cord, cable, filament, strand, and the like.

While plastic sleeves have heretofore been proposed for joining members such as the shank of a fish hook to a leader, the plastic sleeves were of the type utilizing a highly volatile chemical in a solution to dilate the sleeves which then shrank as the chemical evaporated. The use of this type of tubing is not suitable for joining wire cords used in a weaving process because static electricity in generated and such a dilator solution poses a danger. Moreover, the plastic tubing is limp when being handled and is difficult to handle, and the evaporation of the dilator solution requires more time than is desirable.

It is an object of the present invention to provide a new and improved method of joining wire tire cords rapidly.

In accordance with the invention, the method of joining the end lengths of two wire cords comprises bending a first wire cord near the end thereof, disposing the end length of the first cord within a heat-shrinkable tubing, and bending a second wire cord near the end thereof. The method also comprises interlocking the bent regions of the cords, disposing the tubing over the interlocked regions of the cords and applying heat to the tubing to shrink the tubing tightly to join the end lengths of the wire cords.

Referring now to the drawings.

For a better understanding of the present invention, together with other and further objects thereof, reference is made to the following description, taken in connection with the accompanying drawings, and its scope will be pointed out in the appended claims.

Figure 1:
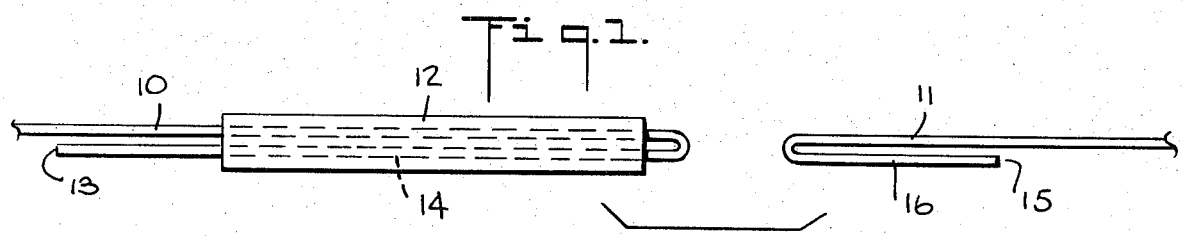
FIG. 1 is a side elevational view of wires and tubing at one step of the method.

Referring now more particularly to FIG. 1 of the drawings, the method of joining the end lengths of two wire cords 10, 11 comprises bending a first wire cord 10 near the end 13 thereof and disposing the end length 14 of the cord within a heat-shrinkable tubing 12, as represented in FIG. 1. The heat-shrinkable tubing may be, for example, a commercially available heat-shrinkable plastic tubing such as that sold by Electrical Insulation Supply, Atlanta, Georgia under the trademark Shrink-Tube Thermo-fit or the tubing may be, for example, a plastic tubing containing a vinyl resin such as described in U.S. Pat. No. 2,027,962 or the tubing may be, for example, a polyolefin material such as described in U.S. Pat. No. 3,243,211. The tubing 12 is disposed over the wire cord 10 in its heat unstable or expanded state. It will be understood that the cord 10 may be the cord from a new spool of wire tire cord to be connected to the spent end of a leading cord 11 in the loom. The bend in the wire 10 should be made as sharp as possible. The method also comprises the step of bending a second wire cord 11 near the end 15 thereof, as represented in FIG. 1. The bend of the wire 11 preferably provides an end length 16 as near three quarters of an inch long as possible and as sharp as possible a bend. Bends providing end lengths shorter than three quarters of an inch tend to rupture the tubing. The bend of the wire 10 preferably provides an end length 14 of approximately 2 ¼ inches long with as sharp as possible a bend. A bend providing an end length 14 between 2 and 2 ½) inches long allows for positioning the tubing 12 along the cord 10 and end length 14 while keeping the end length 14 to a minimum. The wire cord gauge may be, for example, 0.020 to 0.030 inch.

Figure 2:
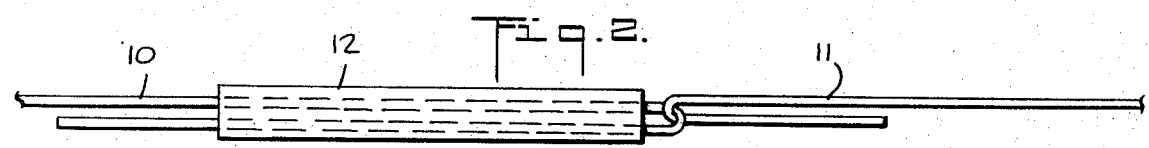
FIG. 2 is a side elevational view of the cords and tubing at another step of the method.
Figure 3:
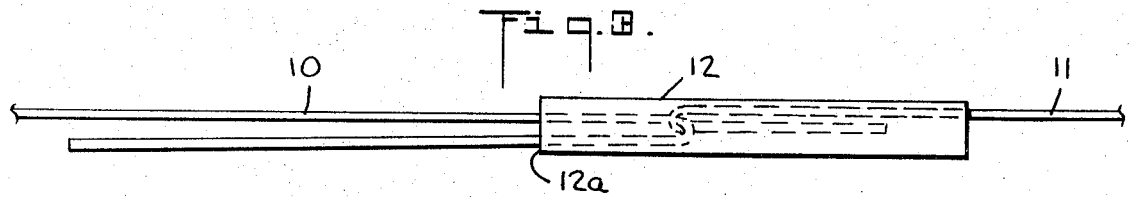
FIG. 3 is a side elevational view of the cords and tubing at another step of the method.
Figure 4:
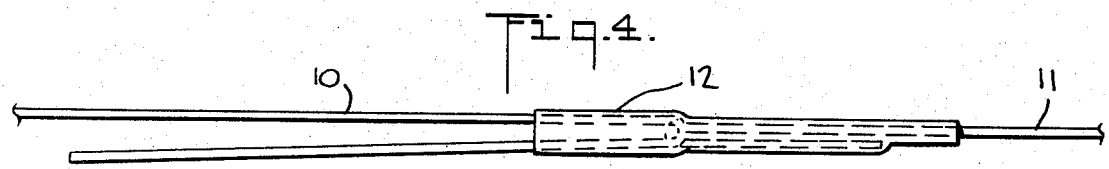
FIG. 4 is a side elevational view of the cords and tubing at the completion of the method.

The method also comprises the step of interlocking the bent regions of the cords as represented in FIG. 2 and disposing the tubing 12 over the interlocked regions of the cords as represented in FIG. 3. The length of the tubing 12 may, for example, be 1 ½ inches and the trailing end 12a of the tubing preferably is disposed approximately ½ inch from the interlocked regions of the cords.

The method also includes the step applying heat to the tubing to shrink the tubing tightly to join the end lengths of the wire cords. The heat may be applied with a hot air gun preferably from the leading end 15 of the cord 11 toward the trailing end 13 of the cord 10 with the major heat being concentrated on the cord 11 and being gradually reduced toward the portion of the tubing over the end length of the cord 10. This produces maximum shrinkage of the tubing over the cord 11 while minimizing the possibility of tubing rupture due to bend torque. If the bends are made as sharp as possible very little heat is necessary in the bent region. The temperature of the hot air may be, for example, 125° C.

Figure 5:
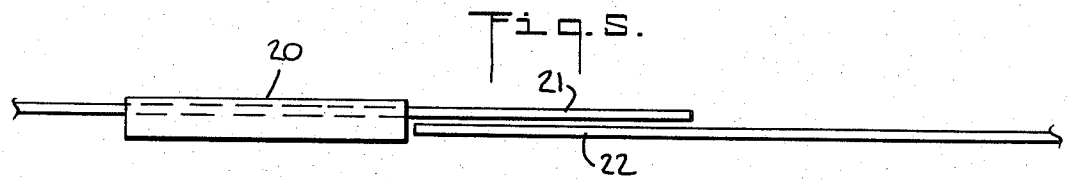
FIG. 5 is a side elevational view of cords and tubing at one step of a modified method in accordance with the invention.
Figure 6:
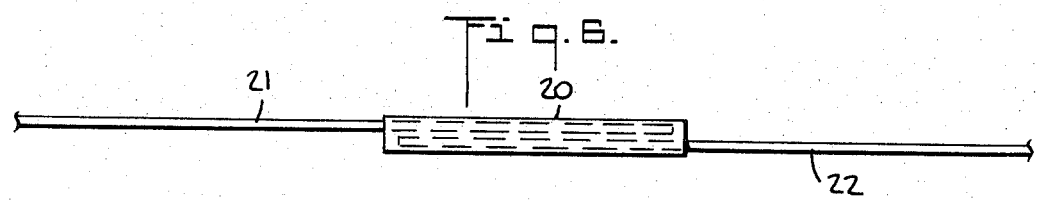
FIG. 6 is a side elevational view of the cords and tubing at another step of the modified form of the invention.
Figure 7:
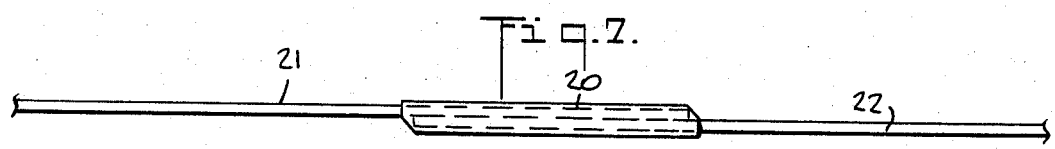
FIG. 7 is a side elevational view of the cords and tubing at the completion of the modified method.

Referring now more particularly to FIGS. 5–7, inclusive, a method of joining the end lengths of two wire cords comprises disposing a heat shrinkable plastic tubing 20 over one of the wire cords 21,22 and positioning the end lengths of the wire cords 21,22 in contiguous relation with the end lengths extending in opposite directions. The method comprises disposing the heat-shrinkable tubing over the contiguous end lengths of the wire cords and applying heat to the tubing to shrink the tubing tightly to join the end lengths of the wire cords solely by means of the tubing as represented in FIG. 7. The tubing may have a length of, for example, 1 inch and may be of similar material to that described in connection with the method of FIGS. 1–4. We have found that tubing applied in the manner described provides a joint of the end lengths of wire tire cord sufficiently strong for use in a loom.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. The method of joining the end lengths of two wire cords comprising:

bending a first wire cord near the end thereof;

disposing the end length of said first cord within a heat-shrinkable tubing:

bending a second wire cord near the end thereof;

interlocking the bent regions of said cords;

disposing said tubing over said interlocked regions of said cords;

and applying heat to said tubing to shrink said tubing tightly to join the end lengths of said wire cords.

2. The method in accordance with claim 1 in which said tubing has a length of approximately 1 ½ inches, and in which the step of bending said first cord comprises bending said first cord approximately 2 ¼ inches from the end thereof, and in which the step of bending said second cord comprises bending said second cord approximately ¾ inch from the end thereof.

3. The method in accordance with claim 1 in which the step of bending said second cord comprises bending said second cord closer to the end thereof than said first cord is bent and the step of applying heat to said tubing comprises applying heat first to the portion of said tubing over said end length of said second cord and thereafter applying a gradually reduced heat toward the portion of said tubing over said end length of said first cord.

* * * * *